(12) United States Patent
Li et al.

(10) Patent No.: US 10,346,955 B2
(45) Date of Patent: Jul. 9, 2019

(54) IMAGE-FILTERING METHOD AND IMAGE-FILTERING DEVICE

(71) Applicant: Realtek Semiconductor Corporation, Hsinchu (TW)

(72) Inventors: Tsung-Hsuan Li, Taichung (TW); Hao-Tien Chiang, Taipei (TW); Shih-Tse Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 66 days.

(21) Appl. No.: 15/622,040

(22) Filed: Jun. 13, 2017

(65) Prior Publication Data

US 2018/0040105 A1 Feb. 8, 2018

(30) Foreign Application Priority Data

Aug. 5, 2016 (TW) .............................. 105125066 A

(51) Int. Cl.
*G06K 9/40* (2006.01)
*G06T 5/00* (2006.01)
*G06T 5/20* (2006.01)

(52) U.S. Cl.
CPC .............. *G06T 5/002* (2013.01); *G06T 5/003* (2013.01); *G06T 5/20* (2013.01); *G06T 2207/20024* (2013.01); *G06T 2207/20192* (2013.01)

(58) Field of Classification Search
CPC ........... G06T 5/002; G06T 5/003; G06T 5/20; H04N 19/176
See application file for complete search history.

(56) References Cited

U.S. PATENT DOCUMENTS

| 4,724,395 A | 2/1988 | Freeman | |
| 8,204,128 B2 * | 6/2012 | Huchet | H04N 19/176 |
| | | | 375/240.18 |
| 8,314,890 B2 * | 11/2012 | Hosokawa | G06T 5/003 |
| | | | 348/576 |
| 8,995,776 B2 * | 3/2015 | Ikai | G06T 5/001 |
| | | | 382/224 |
| 2008/0019604 A1 * | 1/2008 | Gao | G06T 5/002 |
| | | | 382/260 |
| 2009/0297044 A1 * | 12/2009 | Kokumai | G06K 9/40 |
| | | | 382/219 |

(Continued)

*Primary Examiner* — Gregory M Desire
(74) *Attorney, Agent, or Firm* — CKC & Partners Co., LLC

(57) ABSTRACT

An image-filtering method that includes the steps outlined below is provided. Target image values and an input image having input pixel values are retrieved. A difference function between filtering response values of a desired output image and the target image values is determined, wherein the filtering response values are generated by filtering desired output pixel values of the desired output image based on characteristic filtering coefficients. An optimal solution of a desired output central pixel value of the desired output image is calculated according to a linear equation related to the characteristic filtering coefficients, wherein the optimal solution minimizes a value of the difference function. A corresponding relation between the desired output central pixel values and the input pixel values are retrieved from the optimal solution to calculate optimal filtering coefficients. A filtering circuit performs filtering on each pixel of an image under processing according to the optimal filtering coefficients.

20 Claims, 2 Drawing Sheets

(56) References Cited

U.S. PATENT DOCUMENTS

| | | | | |
|---|---|---|---|---|
| 2012/0251012 A1* | 10/2012 | Ikai | ......................... | H04N 19/44 |
| | | | | 382/232 |
| 2016/0006978 A1* | 1/2016 | Satoh | ................. | H04N 5/23267 |
| | | | | 386/269 |
| 2018/0040105 A1* | 2/2018 | Li | ........................... | G06T 5/002 |

* cited by examiner $$A_{low} = \frac{1}{8} \begin{bmatrix} 6 & 1 & 0 & 1 & 0 & 0 & 0 & 0 & 0 \\ 1 & 5 & 1 & 0 & 1 & 0 & 0 & 0 & 0 \\ 0 & 1 & 6 & 0 & 0 & 1 & 0 & 0 & 0 \\ 1 & 0 & 0 & 5 & 1 & 0 & 1 & 0 & 0 \\ 0 & 1 & 0 & 1 & 4 & 1 & 0 & 1 & 0 \\ 0 & 0 & 1 & 0 & 1 & 5 & 0 & 0 & 1 \\ 0 & 0 & 0 & 1 & 0 & 0 & 6 & 1 & 0 \\ 0 & 0 & 0 & 0 & 1 & 0 & 1 & 5 & 1 \\ 0 & 0 & 0 & 0 & 0 & 1 & 0 & 1 & 6 \end{bmatrix}$$

$$A_{high} = \frac{1}{8} \begin{bmatrix} 2 & -1 & 0 & -1 & 0 & 0 & 0 & 0 & 0 \\ -1 & 3 & -1 & 0 & -1 & 0 & 0 & 0 & 0 \\ 0 & -1 & 2 & 0 & 0 & -1 & 0 & 0 & 0 \\ -1 & 0 & 0 & 3 & -1 & 0 & -1 & 0 & 0 \\ 0 & -1 & 0 & -1 & 4 & 0 & 0 & 0 & 0 \\ 0 & 0 & -1 & 0 & -1 & 3 & 0 & 0 & -1 \\ 0 & 0 & 0 & -1 & 0 & 0 & 2 & -1 & 0 \\ 0 & 0 & 0 & 0 & -1 & 0 & -1 & 3 & -1 \\ 0 & 0 & 0 & 0 & 0 & -1 & 0 & -1 & 2 \end{bmatrix}$$

IMAGE-FILTERING METHOD AND IMAGE-FILTERING DEVICE

RELATED APPLICATIONS

This application claims priority to Taiwan Application Serial Number 105125066, filed Aug. 5, 2016, which is herein incorporated by reference.

BACKGROUND

Field of Disclosure

The present disclosure relates to an image-processing technology. More particularly, the present disclosure relates to an image-filtering method and an image-filtering device.

Description of Related Art

The most common image-processing method is to process the image by using filters. The filters not only perform processing specifically on different parts of an image signal, but also generate filtering response result that represents the intensity of a specific characteristic of the image. However, in some applications, the current filtering technology is not able to enhance the required characteristics efficiently. For example, median filters are often used in false color reduction and are able to remove incorrect colors on sharp edges efficiently. However, the efficiency of the median filters decreases under the condition of smooth edges. Besides, the median filters are not able to anticipate the change in high frequency signals. The clarity of the output image can not be guaranteed.

Accordingly, what is needed is an image-filtering method and an image-filtering device to address the above issues.

SUMMARY

An aspect of the present invention is to provide an image-filtering method. The image-filtering method includes the steps outlined below. A plurality of target image values and an input image having a plurality of input pixel values are retrieved. A difference function between a plurality of filtering response values of a desired output image and the target image values is determined, wherein the filtering response values are generated by filtering a plurality of desired output pixel values of the desired output image based on at least one group of characteristic filtering coefficients. An optimal solution of a desired output central pixel value of the desired output image is calculated according to a linear equation related to the characteristic filtering coefficients, wherein the optimal solution minimizes a value of the difference function. A corresponding relation between the desired output central pixel value and the input pixel values is retrieved from the optimal solution to calculate at least a group of optimal filtering coefficients according to the corresponding relation. Filtering is performed on each pixel of an image under processing according to the optimal filtering coefficients by a filtering circuit.

Another aspect of the present invention is to provide an image-filtering device. The image-filtering device includes a calculating module and a filtering circuit. The calculating module is configured for retrieving a plurality of target image values and an input image having a plurality of input pixel values, determining a difference function between a plurality of filtering response values of a desired output image and the target image values, wherein the filtering response values are generated by filtering a plurality of desired output pixel values of the desired output image based on at least one group of characteristic filtering coefficients, calculating an optimal solution of a desired output central pixel value of the desired output image according to a linear equation related to the characteristic filtering coefficients, wherein the optimal solution minimizes a value of the difference function and retrieving a corresponding relation between the desired output central pixel value and the input pixel values from the optimal solution to calculate at least a group of optimal filtering coefficients according to the corresponding relation. The filtering circuit is configured for performing filtering on each pixel of an image under processing according to the optimal filtering coefficients.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In order to make the objects, technical solutions and advantages of the present disclosure apparent, diagrams in combination of examples are used to describe the present disclosure in further detail. It should be understood that the specific embodiments described herein are merely examples for explaining the present disclosure and are not intended to limit the present disclosure.

Figures 1, 2:
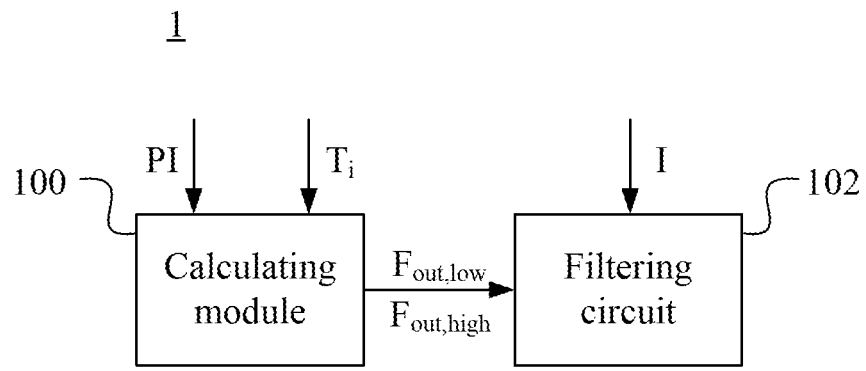
FIG. 1 is a block diagram of an image-filtering device in an embodiment of the present invention.
FIG. 2 is a diagram of a form of matrix multiplication of the low-pass filtering coefficients and the high-pass filtering coefficients in an embodiment of the present invention.

Reference is now made to FIG. 1. FIG. 1 is a block diagram of an image-filtering device 1 in an embodiment of the present invention. The image-filtering device 1 can perform filtering on an image under processing I that includes a plurality of pixels to generate a filtered image.

In the present embodiment, the image-filtering device 1 includes a calculating module 100 and a filtering circuit 102.

The calculating module 100 is configured for retrieving a plurality of target image values $T_i$ and an input image PI having a plurality of input pixel values $P_{in}$. The input image PI includes N×N pixels, wherein N is an odd number and is smaller than or equal to 5. For example, the input image PI is an image that includes 3×3 pixels. Moreover, the input pixel values $P_{in}$ of the input image PI can include red color input pixel values $P_{in,R}$, blue color input pixel values $P_{in,B}$, and green color input pixel values $P_{in,G}$. However, the present invention is not limited thereto.

The calculating module 100 determines a difference function E between a plurality of filtering response values $A_i \times P_t$ of a desired output image PO (not illustrated) and the target image values $T_i$. The filtering response values $A_i \times P_{out}$ are generated by filtering a plurality of desired output pixel values $P_{out}$ of the desired output image PO based on at least one group of characteristic filtering coefficients $A_i$. The desired output pixel values $P_{out}$ include red color desired output pixel values $P_{out,R}$, blue color desired output pixel values $P_{out,B}$ and green color desired output pixel values $P_{out,G}$.

Take the application of false color reduction as an example, in order to match the characteristic of human eyes, the sample rate of the channel of the green pixels in the color filter array (CFA) of the image-retrieving device for retrieving images is higher. The high frequency information thereof is thus more reliable. As a result, the ideal filtering result is that the low-pass filter response of the output of the channels of red color and blue color should be close to the original value and the high-pass filter response should be close to the image of the high-pass filter response values of the channel of green color such that the false color is reduced.

Based on the above description, since the interested image characteristic is the regional intensity trend and regional grains, the characteristic filtering coefficients $A_i$ used to perform filtering can be retrieved from the low-pass filtering coefficients $A_{low}$ and the high-pass filtering coefficients $A_{high}$. For the image having 3×3 pixels mentioned above, after vectorizing the pixels into a 9×1 vector, the operation of convolution by using the filtering coefficients can be expressed as a matrix multiplication.

Reference is now made to FIG. 2. FIG. 2 is a diagram of a form of matrix multiplication of the low-pass filtering coefficients $A_{low}$ and the high-pass filtering coefficients $A_{high}$ in an embodiment of the present invention. Each row of coefficients is for filtering the desired output pixel values $P_{out}$ vectorized into a 9×1 under different boundary conditions of each of the pixels, such as a location of the center or the edge of an image.

As described above, for the desired output pixel values $P_{out}$, e.g. the red color desired output pixel value $P_{out,R}$, the ideal filtering result is that the low frequency result should be close to the red color input pixel value $P_{in,R}$, and the high frequency result should be close to the green color input pixel value $P_{in,G}$. As a result, the above requirement is expressed by the following two equations:

$$A_{low} \times P_{out,R} = A_{low} \times P_{in,R} \qquad \text{(formula 1)}$$

$$A_{high} \times P_{out,R} = A_{high} \times P_{in,G} \qquad \text{(formula 2)}$$

According to the two formulas described above, $A_{low} \times P_{out,R}$ and $A_{high} \times P_{out,R}$ are the filtering response values of the red color desired output pixel value $P_{out,R}$ at low frequency and at high frequency respectively. $A_{low} \times P_{in,R}$ and $A_{high} \times P_{in,G}$ are the target image values $T_i$.

In an embodiment, the difference function E is a weighted square error between the filtering response values $A_i \times P_{out}$ and the target image values $T_i$. When the weighting coefficient that corresponds to the characteristic filtering coefficient $A_i$ is $\lambda_i$, the difference function E is expressed by the following formula:

$$E = \sum_i \lambda_i \|A_i P_{out} - T_i\|^2 \qquad \text{(formula 3)}$$

When the characteristic filtering coefficients $A_i$ are the low-pass filtering coefficients $A_{low}$ and the high-pass filtering coefficients $A_{high}$, the desired output pixel values $P_{out}$ are the red color desired output pixel values $P_{out,R}$, the filtering response values $A_i \times P_{out}$ are $A_{low} \times P_{out,R}$ and $A_{high} \times P_{out,R}$, the target image values $T_i$ are $A_{low} \times P_{in,R}$ and $A_{high} \times P_{in,G}$, and the weighting coefficients respectively corresponding to the low-pass filtering coefficients $A_{low}$ and the high-pass filtering coefficients $A_{high}$ are $\lambda_{low}$ and $\lambda_{high}$, the formula 3 can be further expressed as:

$$E = \lambda_{low}\|A_{low}P_{out,R} - A_{low}P_{in,R}\|^2 + \lambda_{high}\|A_{high}P_{out,R} - A_{high}P_{in,G}\|^2 \qquad \text{(formula 4)}$$

Based on the difference function E, the calculating module 100 further calculates an optimal solution of a desired output central pixel value $P_{out}$ according to a linear equation related to the characteristic filtering coefficients $A_i$. More specifically, the optimal solution minimizes a value of the difference function E. According to the theory of the linear algebra, for the desired output central pixel value $P_{out}$, the optimal solution is the solution of the following linear equation:

$$\left(\sum_i \lambda_i A_i^T A_i\right) P_{out} = \sum_i \lambda_i A_i^T T_i \qquad \text{(formula 5)}$$

As a result, when the desired output central pixel value $P_{out}$ is the red color desired output pixel values $P_{out,R}$ and the weighting coefficients respectively corresponding to the low-pass filtering coefficients $A_{low}$ and the high-pass filtering coefficients $A_{high}$ are $\lambda_{low}$ and $\lambda_{high}$, the optimal solution is further expressed as:

$$(\lambda_{low}A_{low}^T A_{low} + \lambda_{high}A_{high}^T A_{high})P_{out,R} = \lambda_{low}A_{low}^T(A_{low}P_{in,R}) + \lambda_{high}A_{high}^T(A_{high}P_{in,G}) \qquad \text{(formula 6)}$$

In an embodiment, if the solution is solved by processing all the red color desired output pixel values $P_{out,R}$, the computation amount is large. If the method of sliding window is used, only the optimal solution of the central pixel value in the window of the desired output image PO is needed to be solved. Take the desired output image PO having 3×3 as an example, the desired output central pixel is the fifth pixel. As a result, the optimal solution is expressed as $P_{out,R,5}$. By using Cramer's rule, the solution is expressed as:

$$P_{out,R,5} = \det(B)/\det(A) \qquad \text{(formula 7)}$$

The matrix A is $$\sum_i \lambda_i A_i^T A_i.$$

More specifically, the matrix A is $\lambda_{low}A_{low}^T A_{low} + \lambda_{high}A_{high}^T A_{high}$. The matrix B is generated by replacing the fifth column of the matrix A by $$\sum_i \lambda_i A_i^T T_i,$$

more specifically, $\lambda_{low}A_{low}^T(A_{low}P_{in,R}) + \lambda_{high}A_{high}^T(A_{high}P_{in,G})$. As a result, the matrix A is actually unrelated with the input image I and can be directly calculated. On the other hand, 2n−1 cofactors obtained from the n-th column in matrix B are, $B_1 \ldots B_{(2n-1)}$, and det(B) can be alternatively expressed as:

$$\det(B) = \sum_i (D\lambda_i A_i^T)t_i / \det(A) = \qquad \text{(formula 8)}$$

-continued $$\sum_i ([B_1 \ldots B_{(2n-1)}]/\det(A))\lambda_i A_i^T t_i =$$

$$([B_1 \ldots B_9]/\det(A))\lambda_{low} A_{low}^T (A_{low} P_{in,R}) +$$

$$([B_1 \ldots B_9]/\det(A))\lambda_{high} A_{high}^T (A_{high} P_{in,G})$$

The matrix D is $\lfloor B_1 \ldots B_{(2n-1)} \rfloor / \det(A)$.

If the matrix $C_k$ is a matrix obtained by replacing the fifth column of the matrix A by the vector $V_k$, wherein the values of all the entries of the vector are 0 except that the k-th entry is 1, the det(B) can be alternatively expressed as:

$$\det(B) = [\det(C_1) \ldots \det(C_9)] \lambda_{low} A_{low}^T (A_{low} P_{in,R}) + [\det(C_1) \ldots \det(C_9)] \lambda_{high} A_{high}^T (A_{high} P_{in,G}) \quad \text{(formula 9)}$$

The $\det(C_k)$ can also be directly calculated. As a result, the calculating module 100 retrieves a corresponding relation between the desired output central pixel value $P_{out,R,5}$ and the input pixel values $P_{in,R}$ and $P_{in,G}$ from the optimal solution $P_{out,R,5}$ to calculate optimal filtering coefficients according to the corresponding relation:

$$f_{opt,low} = ([\det(C_1) \ldots \det(C_9)] \lambda_{low} A_{low}^T A_{low}) / \det(A) \quad \text{(formula 10)}$$

$$f_{opt,high} = ([\det(C_1) \ldots \det(C_9)] \lambda_{high} A_{high}^T A_{high}) / \det(A) \quad \text{(formula 11)}$$

Each of the optimal filtering coefficients $f_{opt,low}$ and $f_{opt,high}$ is a 1×9 vector matrix. After rearranging the vector matrix in a 3×3 form, the vector matrix becomes the filtering coefficients used to filter a 3×3 image.

The filtering circuit 102 can receive the image under processing I from such as, but not limited to a image-retrieving device or other image source. Subsequently, the filtering circuit 102 performs filtering on each pixel of the image under processing I according to the optimal filtering coefficients $f_{opt,low}$ and $f_{opt,high}$.

The advantage of the present invention is that the calculating module 100 of the image-filtering device 1 can generate the optimal filtering coefficients $f_{opt,low}$ and $f_{opt,high}$ such that the filtering response of the desired output pixel values $P_{out}$ of the desired output image PO is close to the corresponding target image values $T_i$. Under such a condition, the desired output image PO includes the desired characteristics. Moreover, the filtering circuit 102 performs image processing on the image under process I according to the optimal filtering coefficients to perform filtering based on the requirements.

It is appreciated that the calculating module 100 can be implemented by other hardware components such as databases, processors, computing devices, servers or other unique hardware devices having specific logic circuits, or by equipments having specific functions such as a unique hardware integrated by software codes and processor/chip. The method executed by the calculating module 100 can be implemented as a computer program. The computer program can be stored on a computer-readable recording medium such that the computer executes the method after recording the computer-readable recording medium. Computer-readable recording medium may be read-only memory, flash memory, floppy disk, hard disk, CD, flash drives, magnetic tape, a database accessible by the Internet or other medium that those familiar with this skill in the art can easily think of, and has the same function The filtering circuit 102 can include such as, but not limited to passive filtering components such as capacitors, resistors and inductors and/or active filtering components such as transistors or operational amplifiers.

Besides, in an embodiment, for the N×N pixels included in input image PI, the number N can be greater that 5. However, the computation amount becomes very large under such a condition. Since the filtering response is regional, the response value is mainly related to the pixel values within a regional block. As a result, when the number N smaller than or equal to 5 is used, the computational amount can be greatly reduced. Besides, in other embodiments, other functions can be selected as the difference function E according to the requirements of the user. Other values can also be selected as the target values by the user according to the requirements of the user. The present invention is not limited thereto.

In another embodiment, the characteristic of the blue color desired output pixel value $P_{out,B}$ is close to that of the red color desired output pixel value $P_{out,R}$. The ideal filtering result is that the low frequency result should be close to the blue color input pixel value $P_{in,B}$, and the high frequency result should be close to the green color input pixel value $P_{in,G}$. As a result, similar method can be used to generate the optimal filtering coefficients related to the blue color desired output pixel value $P_{out,B}$.

In yet another embodiment, the filtering technology mentioned above can also be applied in the field of temporal denoise besides the false color reduction. More specifically, under such a usage scenario, the frequency response values of the desired output pixel values generated by using the low-pass filtering coefficients are expected to be close to the low-pass filtering result of the input image. The frequency response values of the desired output pixel values generated by using the high-pass filtering coefficients are expected to be close to the high-pass filtering result of a former image that the temporal denoise process is performed. As a result, under such a condition, the target image value of the low-pass filtering is generated by performing filtering on the input image values of the input image with the low-pass filtering coefficients. The target image value of the high-pass filtering is generated by performing filtering on the former image that the temporal denoise process is performed with the high-pass filtering coefficients.

Figure 3:
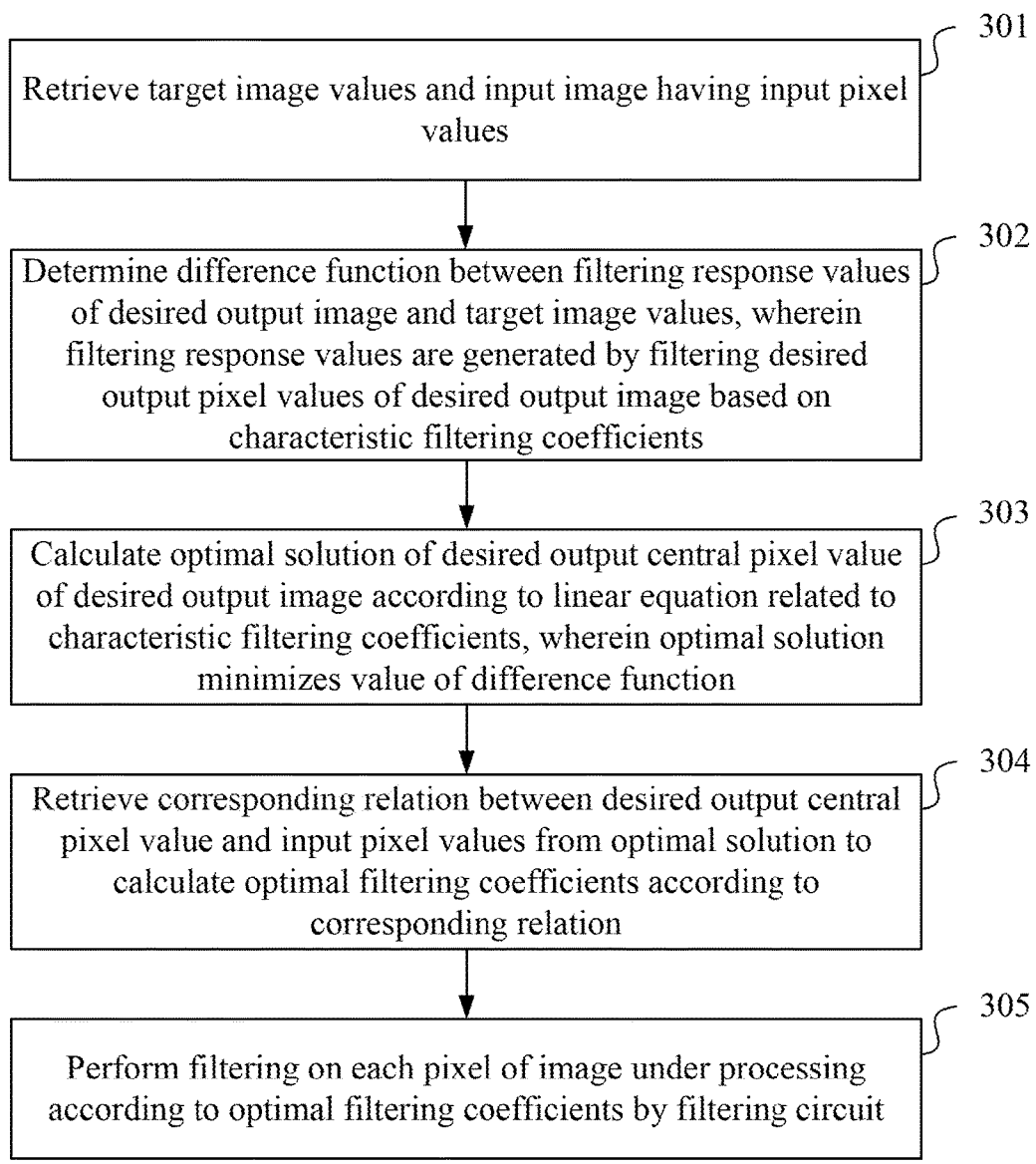
FIG. 3 is a flow chart of an image-filtering method in an embodiment of the present invention.

Referece is now made to FIG. 3. FIG. 3 is a flow chart of an image-filtering method 300 in an embodiment of the present invention. The image-filtering method 300 can be used in such as, but not limited to the image-filtering device 1 illustrated in FIG. 1. The image-filtering method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the calculating module 100 retrieves the target image values $T_i$ and the input image PI having the input pixel values $P_{in}$.

In step 302, the calculating module 100 determines the difference function E between the filtering response values $A_i \times P_{out}$ of the desired output image PO and the target image values $T_i$. The filtering response values $A_i \times P_{out}$ are generated by filtering the desired output pixel values $P_{out}$ of the desired output image PO based on the characteristic filtering coefficients $A_i$.

In step 303, the calculating module 100 calculates the optimal solution $P_{out,R,5}$ of the desired output central pixel value of the desired output image PO according to the linear equation related to the characteristic filtering coefficients $A_i$, wherein the optimal solution $P_{out,R,5}$ minimizes the value of the difference function E.

In step 304, the calculating module 100 retrieves the corresponding relation between the desired output central pixel value and the input pixel values $P_{in}$ from the optimal solution $P_{out,R,5}$ to calculate the optimal filtering coefficients $f_{opt,low}$ and $f_{opt,high}$ according to the corresponding relation.

In step 305, the filtering circuit 102 performs filtering on each pixel of the image under processing I according to the optimal filtering coefficients $f_{opt,low}$ and $f_{opt,high}$.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image-filtering method comprising:
    retrieving a plurality of target image values and an input image having a plurality of input pixel values, wherein each of the target image values is selected from an image value related to an image characteristic desired to be outputted;
    determining a difference function between a plurality of filtering response values of a desired output image and the target image values, wherein the filtering response values are generated by filtering a plurality of desired output pixel values of the desired output image based on at least one group of characteristic filtering coefficients;
    calculating an optimal solution of a desired output central pixel value of the desired output image according to a linear equation related to the characteristic filtering coefficients, wherein the optimal solution minimizes a value of the difference function;
    retrieving a corresponding relation between the desired output central pixel value and the input pixel values from the optimal solution to calculate at least a group of optimal filtering coefficients according to the corresponding relation; and
    performing filtering on each pixel of an image under processing according to the optimal filtering coefficients by a filtering circuit.

2. The image-filtering method of claim 1, wherein each of the input image and the desired output image comprises N×N pixels, wherein N is an odd number and is smaller than or equal to 5.

3. The image-filtering method of claim 1, wherein the difference function is a weighted squared error of the filtering response values and the target image values.

4. The image-filtering method of claim 3, wherein the group of characteristic filtering coefficients is a matrix $A_i$, the desired output pixel values are a vector $P_{out}$, the target image values are a vector $T_i$, a group of weighing coefficients that the group of characteristic filtering coefficients corresponds to is $\lambda_i$, and the difference function is $$\sum_i \lambda_i \|A_i P_{out} - T_i\|^2,$$

wherein wnen a first matrix A is $$\sum_i \lambda_i A_i^T A_i$$

and a second matrix B is generated by replacing an n-th column of the first matrix A by $$\sum_i \lambda_i A_i^T T_i,$$

the optimum solution of the desired output central pixel value is det(B)/det(A), wherein the matrix A; comprises a group of high-pass filtering coefficients $A_{high}$ and a group of low-pass filtering coefficients $A_{low}$, the vector $T_i$ comprises vectors corresponding to a high-pass filtering part and a low-pass filtering part respectively, and the weighing coefficients $\lambda_i$ includes weighting coefficients $\lambda_{low}$ and $\lambda_{high}$ corresponding to the low-pass filtering part and the high-pass filtering part respectively.

5. The image-filtering method of claim 4, wherein when a cofactor of the second matrix B is $B_1 \ldots B_{(2n-1)}$ and a third matrix D is $\lfloor B_1 \ldots B_{(2n-1)} \rfloor$/det(A) the group of optimal filtering coefficients is $$\sum_i D\lambda_i A_i^T.$$

6. The image-filtering method of claim 1, wherein the characteristic filtering coefficients comprise a group of low-pass characteristic filtering coefficients and a group of high-pass characteristic filtering coefficients.

7. The image-filtering method of claim 6, wherein the desired output pixel values comprise a plurality of first color desired output pixel values corresponding to a first color, the filtering response values comprise a plurality of low-pass filtered first color desired output pixel values generated by filtering the first color desired output pixel values based on the characteristic low-pass filtering coefficients and a plurality of high-pass filtered first color desired output pixel values generated by filtering the first color desired output pixel values based on the characteristic high-pass filtering coefficients, and the target image values comprise a plurality of low-pass filtered target values and a plurality of high-pass filtered target values.

8. The image-filtering method of claim 7, wherein the low-pass filtered target values are generated by performing filtering on a plurality of first color input pixel values of the input image with the group of characteristic low-pass filtering coefficients, and the high-pass filtered target values are generated by performing filtering on a plurality of second color input pixel values of the input image with the group of characteristic high-pass filtering coefficients, wherein the second color input pixel values correspond to a second color.

9. The image-filtering method of claim 8, wherein the first color is red or blue, and the second color is green.

10. The image-filtering method of claim 6, wherein the filtering response values comprise a plurality of low-pass filtered desired output pixel values generated by filtering the desired output pixel values based on the characteristic low-pass filtering coefficients and a plurality of high-pass filtered desired output pixel values generated by filtering the desired output pixel values based on the characteristic high-pass filtering coefficients, and the target image values comprise a plurality of low-pass filtered target values and a plurality of high-pass filtered target values, wherein the low-pass filtered target values are generated by filtering a plurality of input pixel values of the input image based on the group of characteristic low-pass filtering coefficients, and the high-pass filtered target values are generated by filtering the input pixel values of the input image based on the group of characteristic high-pass filtering coefficients.

11. An image-filtering device comprising:
a calculating module configured for:
retrieving a plurality of target image values and an input image having a plurality of input pixel values;
determining a difference function between a plurality of filtering response values of a desired output image and the target image values,
wherein the filtering response values are generated by filtering a plurality of desired output pixel values of the desired output image based on at least one group of characteristic filtering coefficients;
calculating an optimal solution of a desired output central pixel value of the desired output image according to a linear equation related to the characteristic filtering coefficients, wherein the optimal solution minimizes a value of the difference function; and
retrieving a corresponding relation between the desired output central pixel value and the input pixel values from the optimal solution to calculate at least a group of optimal filtering coefficients according to the corresponding relation; and
a filtering circuit configured for performing filtering on each pixel of an image under processing according to the optimal filtering coefficients.

12. The image-filtering device of claim 11, wherein each of the input image and the desired output image comprises N×N pixels, wherein N is an odd number and is smaller than or equal to 5.

13. The image-filtering device of claim 11, wherein the difference function is a weighted squared error of the filtering response values and the target image values.

14. The image-filtering device of claim 13, wherein the group of characteristic filtering coefficients is a matrix $A_i$, the desired output pixel values are a vector $P_{out}$, the target image values are a vector $T_i$, a group of weighing coefficients that the group of characteristic filtering coefficients corresponds to is $\lambda_i$, and the difference function is $$\sum_i \lambda_i \|A_i P_{out} - T_i\|^2,$$

wnerein when a first matrix A is $$\sum_i \lambda_i A_i^T A_i$$

and a second matrix B is generated by replacing an n-th column of the first matrix A by $$\sum_i \lambda_i A_i^T T_i,$$

the optimum solution of the desired output central pixel value is det(B)/det(A).

15. The image-filtering device of claim 14, wherein when a cofactor of the second matrix B is $B_1 \ldots B_{(2n-1)}$ and a third matrix D is $\lfloor B_1 \ldots B_{(2n-1)} \rfloor / \det(A)$, the group of optimal filtering coefficients is $$\sum_i D \lambda_i A_i^T.$$

16. The image-filtering device of claim 11, wherein the group of characteristic filtering coefficients comprises a group of characteristic low-pass filtering coefficients and a group of characteristic high-pass filtering coefficients.

17. The image-filtering device of claim 16, wherein the desired output pixel values comprise a plurality of first color desired output pixel values corresponding to a first color, the filtering response values comprise a plurality of low-pass filtered first color desired output pixel values generated by filtering the first color desired output pixel values based on the characteristic low-pass filtering coefficients and a plurality of high-pass filtered first color desired output pixel values generated by filtering the first color desired output pixel values based on the characteristic high-pass filtering coefficients, and the target image values comprise a plurality of low-pass filtered target values and a plurality of high-pass filtered target values.

18. The image-filtering device of claim 17, wherein the low-pass filtered target values are generated by performing filtering on a plurality of first color input pixel values of the input image with the group of characteristic low-pass filtering coefficients, and the high-pass filtered target values are generated by performing filtering on a plurality of second color input pixel values of the input image with the group of characteristic high-pass filtering coefficients, wherein the second color input pixel values correspond to a second color.

19. The image-filtering device of claim 18, wherein the first color is red or blue, and the second color is green.

20. The image-filtering device of claim 16, wherein the filtering response values comprise a plurality of low-pass filtered desired output pixel values generated by filtering the desired output pixel values based on the characteristic low-pass filtering coefficients and a plurality of high-pass filtered desired output pixel values generated by filtering the desired output pixel values based on the characteristic high-pass filtering coefficients, and the target image values comprise a plurality of low-pass filtered target values and a plurality of high-pass filtered target values, wherein the low-pass filtered target values are generated by filtering a plurality of input pixel values of the input image based on the group of characteristic low-pass filtering coefficients, and the high-pass filtered target values are generated by filtering the input pixel values of the input image based on the group of characteristic high-pass filtering coefficients.

* * * * *